United States Patent [19]

Wasserman et al.

[11] Patent Number: 4,476,348

[45] Date of Patent: Oct. 9, 1984

[54] CARBON MICROPHONE LINEARIZATION TECHNIQUE

[75] Inventors: Philip D. Wasserman, Cupertino; Terry R. Seaver, San Jose, both of Calif.

[73] Assignee: Anderson Jacobson, Inc., San Jose, Calif.

[21] Appl. No.: 309,031

[22] Filed: Oct. 6, 1981

[51] Int. Cl.$^3$ .................. H04M 11/00; H04R 3/00
[52] U.S. Cl. .................................. 179/2 C; 381/94; 381/112; 179/2 DP
[58] Field of Search ............... 179/1 C, 2 C, 2 DP, 179/1 FS, 1 P, 175.1 A; 375/8; 381/83, 93-95, 112

[56] References Cited

U.S. PATENT DOCUMENTS 3,624,299 11/1971 Meidan .......................... 179/2 C

OTHER PUBLICATIONS

*Electronics*, Apr. 13, 1970, pp. 124–126, "Adding Third Harmonic Cancels Acoustic Coupler's Distortion".

*Primary Examiner*—Gene Z. Rubinson
*Assistant Examiner*—W. J. Brady
*Attorney, Agent, or Firm*—Majestic, Gallagher, Parsons & Siebert

[57] ABSTRACT

A technique for reducing the nonlinear frequency characteristics of a carbon granule microphone of the type generally used in telephone handsets wherein a tone outside the voice range is applied to the microphone simultaneously with the audio signal desired to be transmitted. This technique has particular advantages with telephone modems, especially those where the sending and receiving frequencies are harmonically related.

12 Claims, 2 Drawing Figures

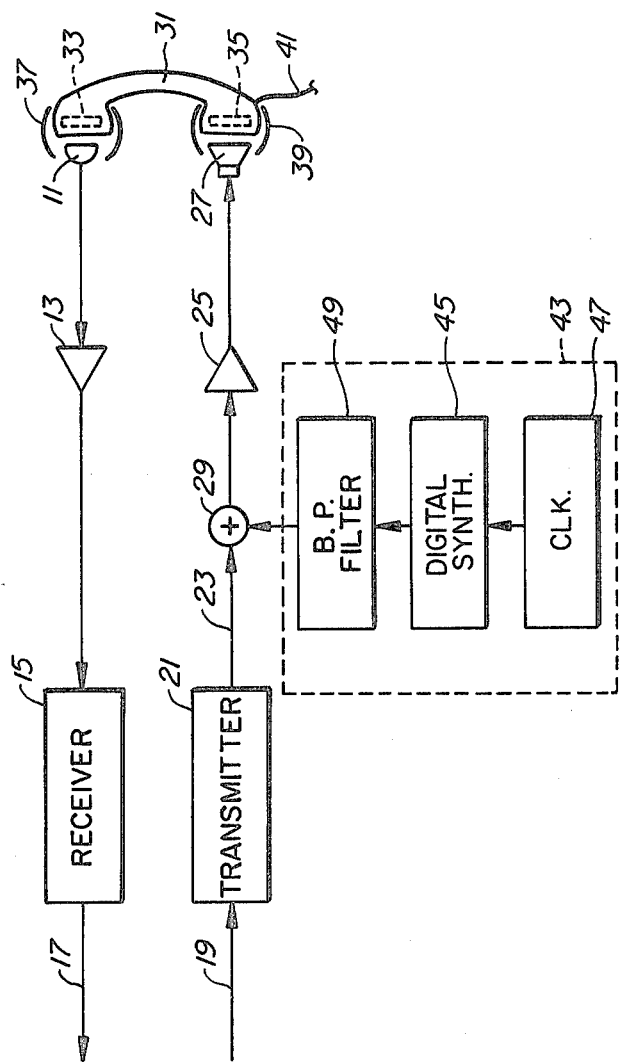
FIG._1.
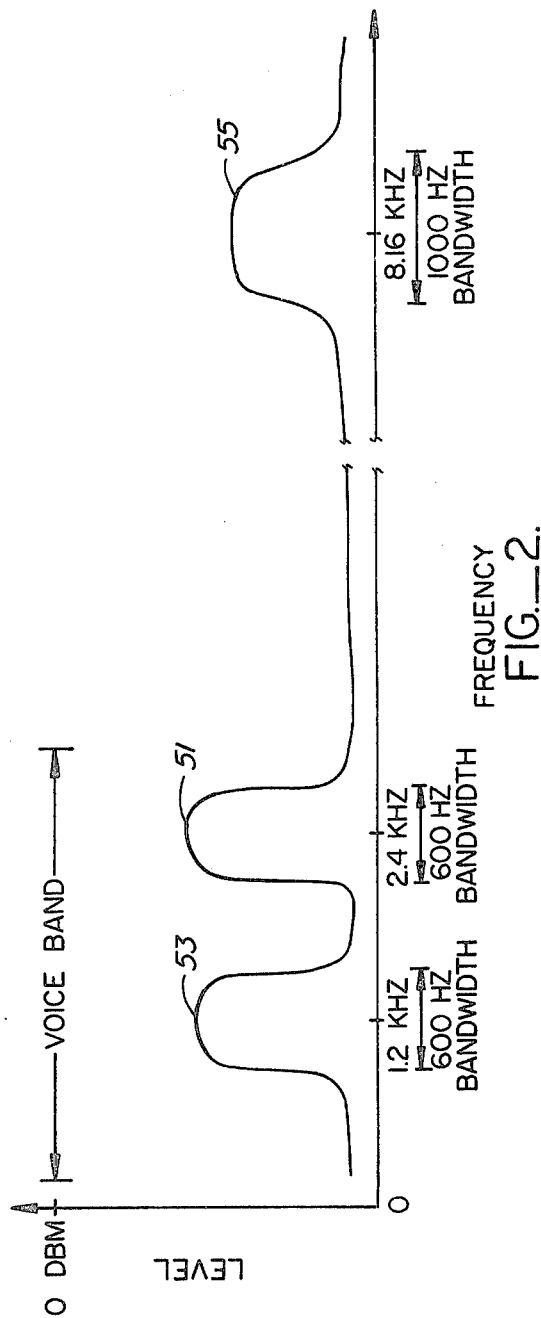
FIG._2.

CARBON MICROPHONE LINEARIZATION TECHNIQUE

BACKGROUND OF INVENTION

This invention relates generally to the art of voice range audio communication, and more particularly such communication that takes place through a carbon granule microphone.

The nonlinear characteristics of carbon microphones are well known. Carbon granule microphones are utilized most widely in telephone handsets where the nonlinearity is of no particular concern for ordinary usage. But when such a microphone is used as part of a communication channel of digital information through a modem and acoustic coupler, the nonlinearities can be a problem. A modem typically operates to transmit and receive data within a voice range (that is, below substantially 3,000 Hz) over a telephone line. One type of modem does so by direct wire connection with the telephone line but another type of modem uses an acoustic coupler in which an ordinary telephone handset is placed. It is with the use of the acoustic coupler that the telephone carbon microphone nonlinear characteristics become part of the data transmission path.

A particular problem has recently appeared in this regard with a modem where in its receiving bandwidth is two times the transmission bandwidth. Therefore, any second harmonics generated from the transmitted signal will fall in the receive band and thus appear as noise that interferes with signals being received by the modem. When an acoustic coupler and certain types of carbon telephone microphones are used, these harmonics become strong enough that the data transmission errors are intolerable.

Therefore, it is an object of the present invention to provide a technique for reducing such harmonics.

SUMMARY OF THE INVENTION

This and additional objects of the present invention are accomplished wherein, briefly, an correction signal having a frequency bandwidth higher than the voice range but within the frequency range of the carbon microphone is applied to the carbon microphone simultaneously with the audio signal to be transmitted. For the usual type of carbon granule microphone used in telephone handsets, this correction signal preferably lies in the range of from 7 to 10 kHz. This technique has been found to make the characteristics of the carbon microphone more linear and thus reduce the harmonics generated by the audio signal which can cause a problem, particularly when the microphone is used as part of an acoustic coupling with a modem having its receiving band twice the frequency of its transmission band. The audio correction signal is not detected or otherwise used by the receiver at the other end, or at the sending end, for it is not necessary to accomplish the purpose of the present invention.

Additional objects, advantages and features of the present invention are described with respect to a preferred embodiment thereof, which description should be taken in conjunction with the accompanying drawings.

BRIEF DESCRIPTION OF THE DRAWINGS

FIG. 1 is a block diagram of a telephone modem and acoustic coupler that utilizes the technique of the present invention; and FIG. 2 illustrates the various frequency bandwidths of operation for the system of FIG. 1.

DESCRIPTION OF A PREFERRED EMBODIMENT

Referring to FIG. 1, the basic components of a telephone modem and acoustic coupler are shown. A microphone 11 of the modem generates an audio frequency electrical signal that is amplified by an amplifier 13 and then applied to a receiver 15 where the signal is converted to digital data at an output 17. The output 17 is thus applied to a piece of digital equipment, such as a terminal, printer and the like. Digital data from such a piece of equipment is applied through a line 19 to a transmitter 21 which converts the digital data into an audio signal at an output 23. This output is applied to an amplifier 25 and thence to a loudspeaker 27. A summing circuit 29 between the transmitter 21 and amplifier 25 does not exist in standard modems but has been added to incorporate the improvement of the present invention therein, as is described hereinafter.

A telephone handset 31 having a receiver 33 and a carbon granule microphone 35 is positioned so that those elements are acoustically coupled, respectively, to the modem's microphone 11 and loudspeaker 27. This is accomplished by standard acoustical cups, shown schematically as 37 and 39. One advantageous acoustic cup design is described in U.S. Pat. No. 4,246,444. The receiver 33 and microphone 35 are electrically coupled to the handset's electrical line 41. Digital data at 19 is thus converted by the modem into audio tones which are coupled into the line 41 through the microphone 35. Similarly, the same type of tones being received from a distant location from another modem are reconverted into digital information at 17.

According to the present invention as applied to a telephone modem, a signal in addition to the desired audio signal, is applied to the carbon granule microphone 35 in order to make it more linear in its response within the voice band. The voice band extends from a few hundred Hz to approximately 3,000 Hz. It is within this band that the audio signals are transmitted and received over the telephone circuits. Such a correction signal could be applied by a loudspeaker separate from the loudspeaker 27 but it is more convenient to apply it to the summing circuit 29 the output of a signal generator 43. The signal generator 43 can be of any one of many types. It is shown here to have as a central element a digital synthesizer 45 that is driven by a standard clock 47. An output analog signal from the digital synthesizer 45 is passed through a bandpass filter 49 in order to reduce undesired frequency components of the signal, and then is applied to the summing circuit 29. The signal is, therefore applied to the loudspeaker 27 simultaneously with the audio signal in the line 23 that is desired to be transmitted a distance through the telephone circuits.

Referring to FIG. 2, a frequency spectrum is illustrated for the operation of the improved system of FIG. 1, according to one specific example. One type of modem with which the technique of the present invention is particulary useful is where a receiving bandwidth 51 is twice that of a transmitting bandwith 53. In this example, the receiving bandwidth 51 is centered about 2,400 kHz, while the transmitting bandwidth 53 is centered about 1,200 kHz, one-half the receiving frequency. Relating to the system of FIG. 1, the receive signals within the bandwidth 51 of FIG. 2 are applied to the receiver 15 and the transmitted signal within the band 53 is generated by the transmitter 21. Since the telephone circuits combine these two signals any second harmonic of the transmitted signals will come back as undesirable noise to the receiver 15 and thus make it difficult to simultaneously receive information, depending on the amplitude of these harmonics. As mentioned previously, the carbon microphone 35, because it is nonlinear, tends to create such second harmonics that are of an amplitude to cause a considerable percentage of errors in the received information.

The signal generator 43 of FIG. 1, in order to aid in correcting the situation, generates, in this specific example, a signal in a band 55 of FIG. 2. The frequency of the correction signal is made to be outside of the normal voice range for telephone circuits (that is, in excess of 3,000 Hz). It must be far enough above the voice range so that troublesome intermodulation products between it and signals within the receiving and transmitting bandwidths 51 and 53 lie outside of those information transmitting bands. At the same time, the signal 55 must be within the frequency response range of the carbon microphone 35. For commonly used carbon granule microphones, an acceptable range is from 7 to 10 kHz. The transmitting and receiving bands 51 and 53 of most types of modems are less than 3,000 Hz. The resulting separation in frequency avoids any undesired intermodulation products from falling within the transmit and receive bands 51 and 53.

The correction signal 55 can be a very narrow bandwidth signal (essentially a single frequency) or can be a broader band signal. Because the tone is heard by the user of the modem, it has been found preferable to use a broad band signal, such as the 1,000 Hz bandwidth indicated in FIG. 2, in order to make it less offensive to the modem's user. Thus, in this particular example for the specific modem being described, a correction signal bandwidth centered about 8.1 kHz has been found to avoid undesirable intermodulation products and to be inoffensive to the user.

The amplitude of the signal 55 affects the linearity of the carbon microphone 35, and thus the level of any second harmonic generation falling within the band 51 that results from a signal being transmitted within the band 53. In a particular example, the energy level of the signal 55 is set at minus 26 dbm while the send data itself is at minus 20 dbm.

Although the present invention has been described with respect to a specific example thereof, it will be understood that the invention is entitled to protection within the scope of the appended claims.

We claim:

1. In an acoustic data coupler designed to transmit data over a telephone line having a voice band and having an input to receive digital signals from a source, a transmitter to convert the digital signals to audio signals within a transmitting bandwidth of the voice band, a loud speaker connected to said transmitter to make the audio signals audible, a microphone, a receiver connected to said microphone to convert audio signals received therefrom within a receiving bandwidth of the voice band to digital data signals, an output from said receiver carrying said digital signals, and an acoustic coupler adapted to hold a telephone hand set with a carbon granule microphone therein acoustically coupled to said speaker, the improvement comprising means connected to said speaker for applying thereto a correction signal simultaneously with a data containing audio signal from said transmitter, said correction signal having a frequency bandwidth outside of said transmitting and receiving bandwidths and of such a frequency so as not to cause undesirable intermodulation distortion products in either of the transmitting or receiving bandwidths with signals therein, said correction signal additionally having substantially a 1,000 Hz. bandwidth wherein the amplitude is substantially uniform, whereby a nonlinearity characteristic of said carbon granule microphone is reduced and distortion caused by such nonlinearity is also reduced.

2. The improved acoustic data coupler according to claim 1 wherein said means for applying a correction signal applies a correction signal above the transmit and receive bandwidths in frequency and outside said voice band.

3. In an acoustic data coupler designed to transmit data over a telephone line having a voice band and having an input to receive digital signals from a source, a transmitter to convert the digital signals to audio signals within a transmitting bandwidth of the voice band, a loud speaker connected to said transmitter to make the audio signals audible, a microphone, a receiver connected to said microphone to convert audio signals received therefrom within a receiving bandwidth of the voice band to digital data signals, an output from said receiver carrying said digital signals, and an acoustic coupler adapted to hold a telephone hand set with a carbon granule microphone therein acoustically coupled to said speaker, the improvement comprising means connected to said speaker for applying thereto a correction signal simultaneously with a data containing audio signal from said transmitter, said correction signal having a frequency bandwidth outside of said transmitting and receiving bandwidths and of such a frequency so as not to cause undesirable intermodulation distortion products in either of the transmitting or receiving bandwidths with signals therein, said means for applying a correction signal includeing means for generating a correction signal whose bandwidth is substantially entirely within the range of from 7,000 to 10,000 Hz., whereby a nonlinearity characteristic of said carbon granule microphone is reduced and distortion caused by such nonlinearity is also reduced.

4. The improved acoustic data coupler according to claim 3 wherein said correction signal applying means includes means for generating said correction signal having substantially a 1,000 Hz. bandwidth wherein the amplitude is substantially uniform.

5. The improved acoustic data coupler according to claim 3 wherein said correction signal applying means includes means for applying said correction signal having an amplitude that is sufficient to increase linearity of the carbon granule microphone, thereby to reduce the harmonics generated in either of the transmit or receive bandwidths.

6. A method of transmitting an audio signal through a carbon granule microphone into a communication circuit, comprising the steps of:

applying to said microphone said audio signal within a voice band that is less than approximately 3,000 hz, and simultaneously applying to said microphone a correction signal that lies substantially within a frequency range of from 7,000 to 10,000 Hz., thereby to make more linear the amplitude characteristics of said microphone across the voice band.

7. The method according to claim 6 wherein the step of applying said correction signal includes applying a correction signal having a bandwidth of substantially one kHz.

8. The method according to claim 6 wherein the step of applying said audio signal includes acoustically coupling said microphone with a loudspeaker output of a telephone modem.

9. The improved acoustic data coupler according to claim 3 wherein the correction signal applied by said correction signal applying means is a multi-frequency signal.

10. The improved acoustic data coupler according to any of claims 1 through 3 wherein said correction signal applying means includes means independent of said transmitter for generating said correction signal.

11. The method according to any of claims 6, 7 or 8 wherein the step of applying a correction signal includes the step of generating said correction signal independent of said audio signal.

12. A method of transmitting and receiving data in the form of audio signals in separate receive and transmit bandwidths within a voice band of a telephone circuit that is less than approximately 3,000 Hz., wherein a carbon granule microphone is utilized to transmit said audio data signal, comprising the steps of:

applying to said microphone said audio data signal within said transmit bandwidth, receiving an audio data signal within the said receive bandwidth from said telephone circuit, and simultaneously applying to said microphone a correction signal having a bandwidth of frequencies that lie substantially entirely above 7,000 Hz. and of such a frequency so as not to cause undesirable intermodulation distortion products in either of the transmit or receive bandwidths, whereby distortion caused by nonlinearity of the carbon granule microphone is reduced without introducing undesirable products of modulation within the transmit or receive bands.

* * * * *